March 6, 1956  A. A. ANDERSON  2,737,314
SEED PLANTER

Filed Aug. 18, 1952  3 Sheets-Sheet 1

INVENTOR
ARDEN A. ANDERSON
BY
Webster & Webster
ATTY'S.

March 6, 1956  A. A. ANDERSON  2,737,314
SEED PLANTER

Filed Aug. 18, 1952  3 Sheets-Sheet 2

INVENTOR
ARDEN A. ANDERSON
BY
Webster & Webster
ATTY'S.

March 6, 1956  A. A. ANDERSON  2,737,314
SEED PLANTER

Filed Aug. 18, 1952  3 Sheets-Sheet 3

INVENTOR
ARDEN A. ANDERSON
BY
Webster & Webster
ATTY'S.

United States Patent Office 2,737,314
Patented Mar. 6, 1956

2,737,314

SEED PLANTER

Arden A. Anderson, Chico, Calif.

Application August 18, 1952, Serial No. 304,927

3 Claims. (Cl. 221—135)

This invention is directed to, and it is a major object to provide, a novel planter of the type, and as distinguished from broadcast seeding, adapted to plant seeds individually and in predetermined spaced relation in a crop row.

Another important object of the invention is to provide a seed planter, of the type described, which is operative to plant seeds which are already germinated; the seeds being carried on the planter in a reservoir containing water, and the planter embodying a novel mechanism which functions automatically to successively pick up individual seeds from the water and deposit such seeds in spaced relation in and along a crop row furrow.

An additional object of the invention is to provide a seed planter, as in the preceding paragraph, wherein said mechanism includes means to pick up the individual seeds at one point by suction, and to discharge such seeds at another point by a compressed air blast.

It is also an object of the invention to provide a seed planter which is designed for ready and convenient manufacture; ease of operation; and long service, with a minimum of servicing, maintenance, or repair being required.

Still another object of the invention is to provide a practical and reliable seed planter, and one which will be exceedingly effective for the purpose for which it is designed.

These objects are accomplished by means of such structure and relative arrangement of parts as will fully appear by a perusal of the following specification and claims.

Figure 1:
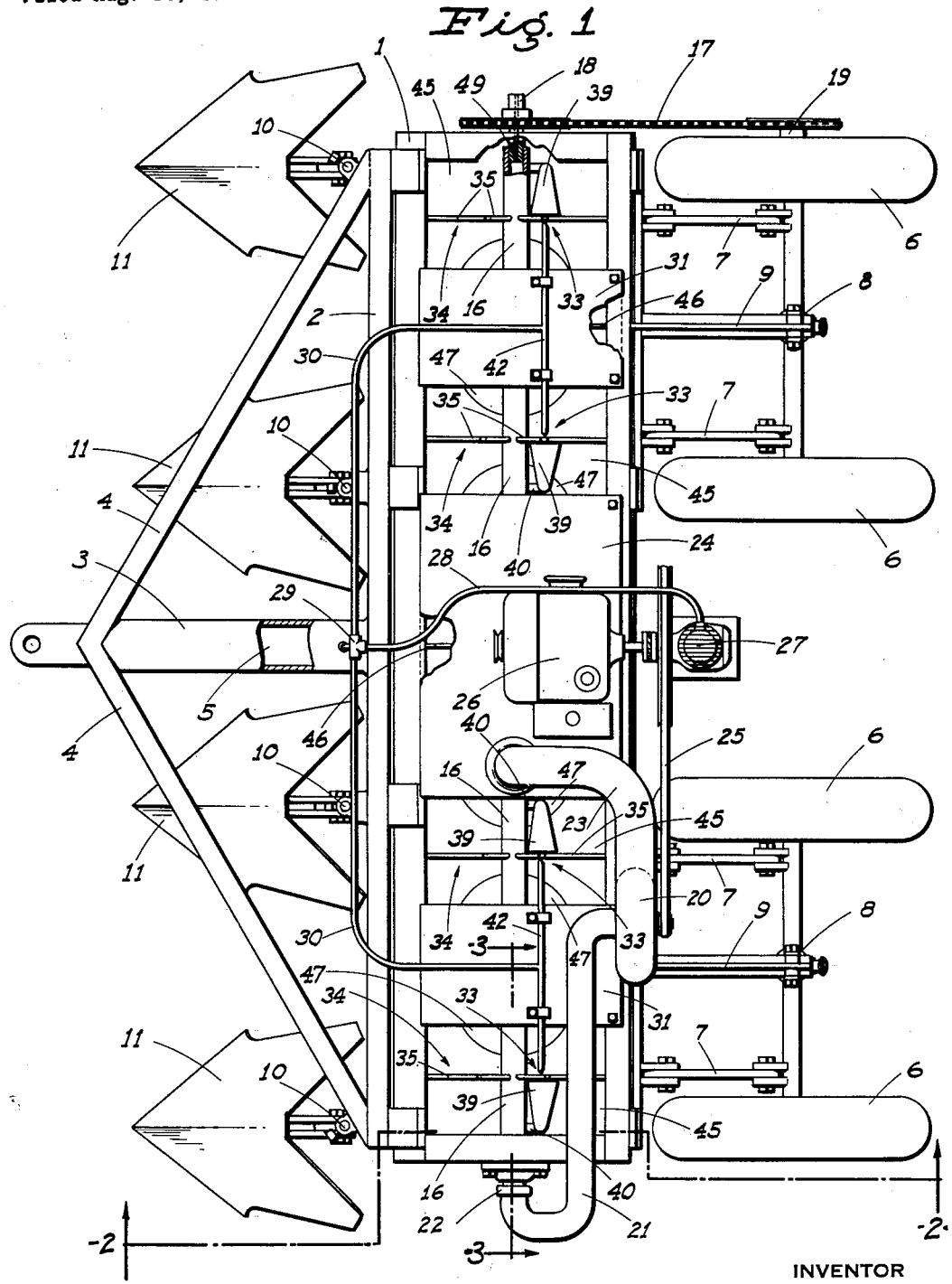
Fig. 1 is a plan view of the speed planter.
Figure 2:
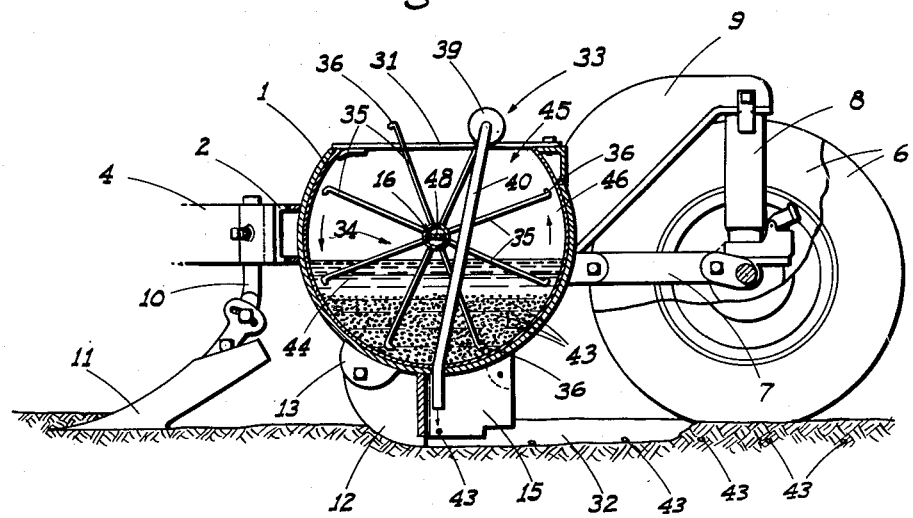
Fig. 2 is a longitudinal sectional elevation on line 2—2 of Fig. 1; the engine and certain of the related parts being omitted.
Figure 4:
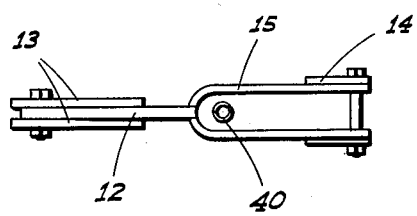
Fig. 4 is a bottom plan view of one of the furrow openers.

Referring now more particularly to the characters of reference on the drawings, the seed planter comprises a transversely extending, open-topped tank 1 which forms the body of the implement.

The tank 1 is fitted, at the front, with a rigid cross bar 2, and a draft tongue 3 projects forwardly from the center point of the cross bar 2; such draft tongue being suitably braced, as at 4, and adapted at the front for connection to a tractor.

The draft tongue 3 is tubular and closed to form an air pressure reservoir 5 for the purpose hereinafter described.

At the rear the tank 1 is supported, for travel along the ground, by transversely spaced pairs of rubber tired wheels 6 mounted in connection with said tank by means including swing frames 7. Each swing frame 7 carries one of the pairs of wheels, and is adapted to be adjusted up or down by a related, manually operated hydraulic jack 8 which connects between such swing frame and a rear overhanging arm 9. The hydraulic jacks 8 are used to adjust the level of the tank 1 and also to regulate its spacing above ground.

The seed planter as here shown is adapted to plant four crop rows, and to this end the cross bar 2 is fitted with four transversely spaced standards 10, each having a cultivator shovel 11 secured to the lower end thereof.

Rearwardly of each cultivator shovel 11, and in central alinement therewith, there is a furrow opener 12 secured to the bottom of the tank 1 by front and rear brackets, indicated at 13 and 14, respectively.

Each furrow opener 12 includes an upstanding, rearwardly opening body portion 15 into which the seeds are individually deposited by the related mechanisms hereinafter described.

A tubular shaft 16 extends axially through the tank 1, being journaled in connection with the ends thereof for rotation; such shaft being driven at a speed proportionate to the ground speed of the implement by an endless chain and sprocket unit 17 connected between a stub shaft 18 included on one end of the shaft 16 and the hub 19 of one rear wheel 6.

A condition of suction is maintained at all times in the tubular shaft 16 by means of a suction pump 20 whose intake is connected by a conduit 21 with the end of the tubular shaft 16 opposite the stub shaft 18.

A suitable fitting 22 connects conduit 21 and shaft 16 in communication, while permitting rotation of the latter.

The suction pump 20 is mounted in suitable manner on a top rear portion of the tank 1. The outlet of the suction pump 20 is connected by a conduit 23 which discharges through a central platform 24 into the tank 1. The suction pump 20 is driven, by an endless belt and pulley unit 25, from a gas engine 26 mounted on the platform 24; such engine also driving an air compressor 27.

A pipe 28 connects the compressor 27 with the air pressure reservoir 5 formed in the draft tongue 3; such reservoir being provided for the purpose of not only pressure storage, but also to damp the impulses of the compressor 27.

A fitting 29 is interposed in the pipe 28 and connects with oppositely extending pipes 30 which lead onto platforms 31 mounted on the tank between the ends thereof and the central platform 24.

The purpose of the pipes 30 will hereinafter appear.

As the mechanisms for picking up seeds one at a time from the tank and discharging said seeds into the furrow 32 formed by each furrow opener 12 are identical, a description of one such mechanism will suffice for all.

Each seed pick-up and discharge mechanism is indicated generally at 33, and includes a spider 34 fixed on the shaft 16; the legs 35 of the spider being of substantial length and tubular. At the outer end of each spider leg 35 it is formed with a head 36 having a mouth 37 which opens in the direction of rotation.

At their inner ends the spider legs are in communication with the interior of the shaft by means of holes 38.

Adjacent the top of the tank 1 each head, as the spider rotates, passes in front of a laterally opening funnel 39 connected to a seed discharge pipe or down-spout 40 which leads through the bottom of the tank 1 into the U-body 15 of the corresponding furrow opener 12.

An air jet nozzle 41 is disposed to discharge into the funnel 39, being mounted in such spaced relation from the funnel that the heads 26 may pass between the nozzle 41 and said funnel. As the heads 36 pass the nozzle 41 they are in direct horizontal alinement therewith.

The nozzle 41 is formed on a lateral pipe 42 which is supported on, and leads out from, one of the platforms 31; the lateral pipes 42 having connection with the corresponding air pressure pipe 30. As a consequence there is a continual air jet or blast from the nozzle 41 into the funnel 39, with the blast thence delivering through the down-spout 34.

In use of the above described implement each seed planting mechanism 33 functions as follows:

With rotation of each spider 34 the mouths 37, as they swing through the lower portion of the tank 1, suction-engage a seed 43; there being a large number of said seeds carried in water 44 in said tank, and the seeds, being germinated, remaining sunk.

Figure 5:
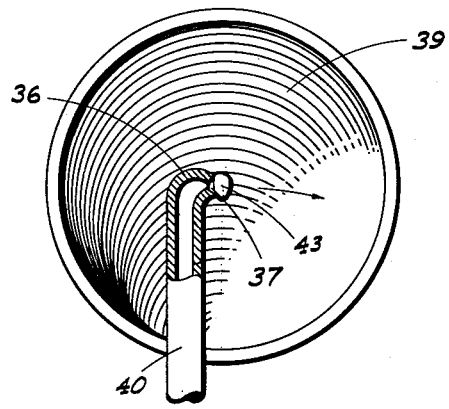
Fig. 5 is a fragmentary elevation showing the mouth end of one of the tubular spider legs as carrying a seed and as disposed directly in front of the seed receiving funnel.
Figure 3:
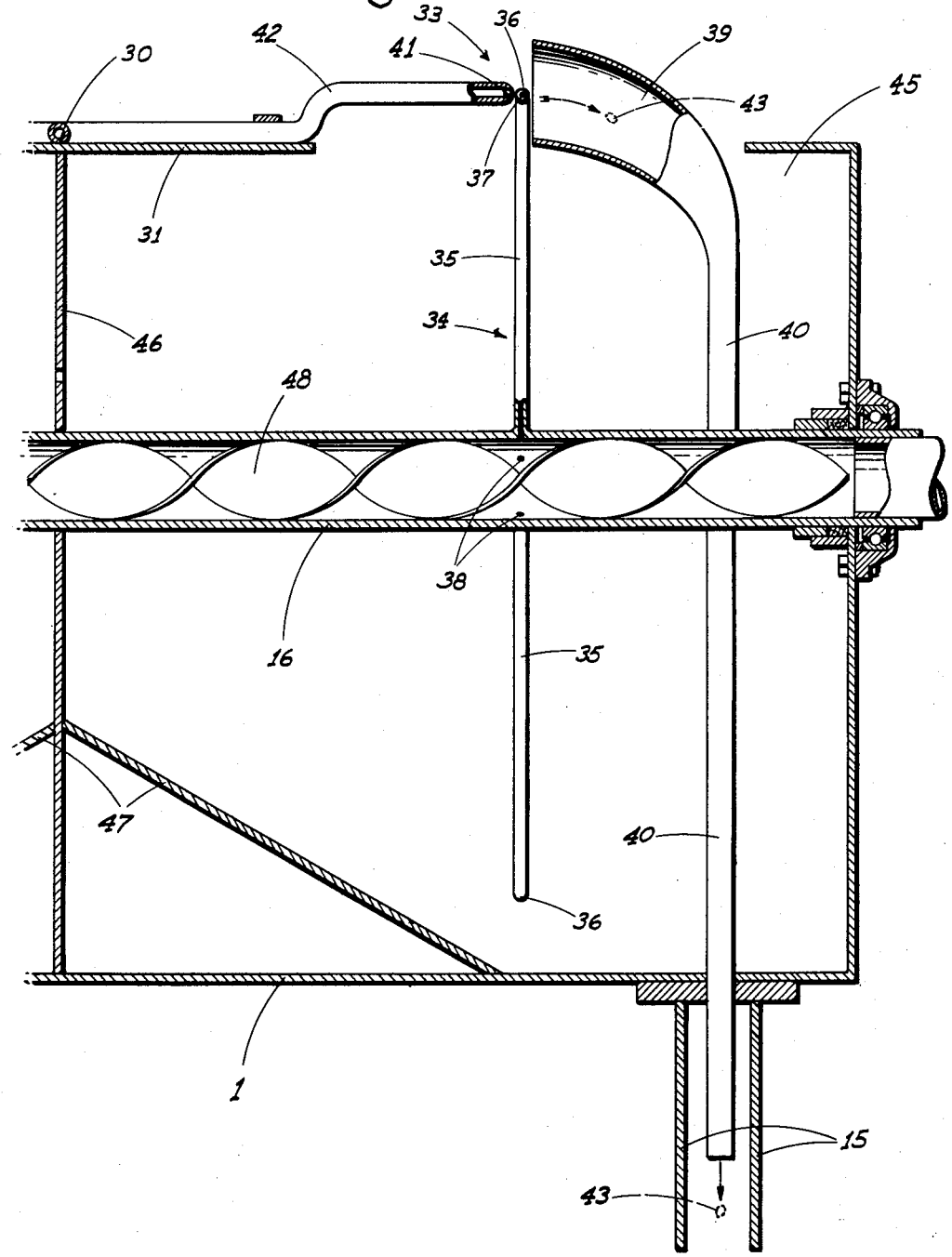
Fig. 3 is an enlarged fragmentary sectional elevation on line 3—3 of Fig. 1.

As the suction-engaged seeds 43 ride upwardly with rotation of the spider 34, they pass between the nozzle 41 and the funnel 39; the air jet or blast from such nozzle driving each such seed free of the mouth 37 and into the funnel 39. Thence the freed seed delivers in the down-spout 40 to discharge through the corresponding furrow opener 12 into the furrow 32; the furrow being closed by the corresponding trailing wheel 6 to thus cover the seed. As will be clearly evident from Fig. 5, a seed 43 is considerably larger than the air intake mouth 37 in the tubular leg 36, so that there is no danger of any seed becoming jammed in the mouth, or passing down into the leg.

In this manner seed is planted individually in each furrow 32 in predetermined spaced relation.

Each of the seed pick-up and discharge mechanisms 33 works in a separate compartment or section 45 of the tank 1, as the latter is separated by cross walls 46; there being an inclined baffle plate 47 between each cross wall 46 and the bottom of the tank. The purpose of each baffle plate 47 is to cause the seeds 43 in the tank 1 to work towards a position directly below the related spider 34.

The tubular shaft 16 is fitted therein, and throughout its length, with a helical deflector blade 48; the purpose of such blade being to maintain in agitation the water which is sucked into such pipe through the tubular spider legs 35. By causing agitation of the water in the tubular shaft 16, there is no tendency for the suction openings or holes 38 which lead to the legs 35 to become clogged or plugged.

As a further aid to assure of proper and uninterrupted suction flow in the tubular shaft 16, the stub shaft—opposite the fitting 22—is formed with an axial bore 49 which bleeds air into said shaft 16.

The water which is drawn into the shaft 16, and thence travels through the conduit 21, pump 20, and conduit 23, discharges back into the tank 1.

From the foregoing description it will be readily seen that there has been produced such a device as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A seed planter comprising a tank adapted to contain water having a quantity of seed therein, wheels supporting the tank for movement along the ground, a tongue projecting forwardly for connection to a tractor, a seed pick-up member having a seed-holding suction mouth thereon, means mounting the member for recurring movement of the mouth from a seed pick-up position in the water and a seed discharge position above the water, power means arranged to so move said member, a source of suction connected to said mouth, a fluid jet nozzle disposed above water in position to blow a suction-engaged seed from the mouth when in said discharge position, a source of air pressure, a conduit connected between the source of air pressure and the nozzle, the tongue being hollow and forming an air pressure reservoir, a connection between said conduit and reservoir, a receiver for seed blown from the mouth, and a seed delivery conduit depending from the receiver to adjacent ground level.

2. A seed planter comprising a tank supported for movement along the ground, the tank being adapted to contain water having a quantity of seed therein, a tubular shaft journaled horizontally in the tank, means to rotate the shaft, a source of suction coupled to the shaft, a spider on the shaft, the spider including tubular legs communicating with and radiating from the shaft, each spider leg including a head on the outer end having a seed pick-up and holding mouth, the mouths when under water picking up individual seeds by suction, a fluid jet nozzle disposed above water in position to blow the suction-engaged seed from each mouth as the latter reaches a predetermined above-water position, a source of fluid pressure connected to said nozzle, a funnel-like receiver in position to catch said blown-off seed, and a down-spout leading from the receiver to adjacent ground level; the source of suction being connected to one end of the tubular shaft, there being a bleed opening in the opposite end of the shaft, and a helical deflector extending in the shaft adjacent the point of communication of the spider legs.

3. A seed planter comprising a tank supported for movement along the ground, the tank being adapted to contain water having a quantity of seed therein, a tubular shaft journaled horizontally in the tank, means to rotate the shaft, a source of suction coupled to the shaft, a spider on the shaft, the spider including tubular legs communicating with and radiating from the shaft, each spider leg including a head on the outer end having a seed pick-up and holding mouth, the mouths when under water picking up individual seeds by suction, a fluid jet nozzle disposed above water in position to blow the suction-engaged seed from each mouth as the latter reaches a predetermined above-water position, and means to receive seed blown from the mouth and guide the seed to a point adjacent ground level; the source of suction being a suction pump, there being conduit means leading from the intake of the pump leading to the suction mouth and another conduit leading from the discharge of the pump to the tank whereby water drawn into the pump from the spider legs will be returned to the tank.

References Cited in the file of this patent

UNITED STATES PATENTS

| 186,800 | Clarridge | Jan. 30, 1877 |
| 773,205 | Green | Oct. 25, 1904 |
| 1,331,235 | Bristow | Feb. 17, 1920 |
| 2,302,499 | Lacson | Nov. 17, 1942 |
| 2,605,017 | Bolen | July 29, 1952 |

FOREIGN PATENTS

| 596,789 | France | Aug. 17, 1925 |
| 988,074 | France | Apr. 25, 1951 |